United States Patent [19]

Chynoweth et al.

[11] Patent Number: 4,460,966
[45] Date of Patent: Jul. 17, 1984

[54] TRANSFER MACHINE CONTROL

[75] Inventors: Lawrence L. Chynoweth, Rochester; Conrad J. Gordon, Mount Clemens, both of Mich.

[73] Assignee: The Cross Company, Fraser, Mich.

[21] Appl. No.: 325,345

[22] Filed: Nov. 27, 1981

[51] Int. Cl.³ .............................................. G06F 15/46
[52] U.S. Cl. ...................................... 364/468; 29/568; 198/340; 198/341; 198/356
[58] Field of Search ......................... 364/468; 29/568; 198/502, 340, 341, 356

[56] References Cited

U.S. PATENT DOCUMENTS

| | | | |
|---|---|---|---|
| 3,703,725 | 11/1972 | Gomersall et al. | 364/468 |
| 3,703,725 | 11/1972 | Gomersall et al. | 444/1 |
| 3,714,401 | 1/1973 | Yano | 364/478 |
| 3,743,090 | 7/1973 | Brown et al. | 198/356 |
| 3,845,286 | 10/1974 | Aronstein et al. | 235/151.1 |
| 3,987,429 | 10/1976 | Manduley et al. | 364/478 |
| 4,027,246 | 5/1977 | Caccoma et al. | 364/468 |
| 4,089,056 | 5/1978 | Barna et al. | 364/551 |
| 4,096,563 | 6/1978 | Slawson | 364/107 |
| 4,172,347 | 10/1979 | Nitz | 198/502 |
| 4,181,947 | 1/1980 | Krauss et al. | 364/478 |
| 4,247,317 | 1/1981 | Wood | 65/29 |
| 4,306,292 | 12/1981 | Head | 364/478 |
| 4,309,600 | 1/1982 | Perry et al. | 364/468 |

Primary Examiner—Jerry Smith
Assistant Examiner—John R. Lastova
Attorney, Agent, or Firm—Cyril M. Hajewski; James O. Skarsten

[57] ABSTRACT

Transfer machine apparatus is provided, which includes a load station for receiving parts during at least some of the part reception periods in a succession of part reception periods, and which further includes a number of selectively located work units for performing prespecified work tasks upon received parts. A transfer mechanism is provided for moving a given one of the received parts from the load station to each of the work units in a prespecified sequence, the given received part being moved from one work unit to another during a part transfer cycle in a succession of part transfer cycles. A digital code storage device receives a digital code during each of the part reception periods, a first digital code being received if a part is received by the load station during a part reception period, and a second digital code otherwise being received. The storage device is provided with a number of discrete digital code storage positions, each of the work units uniquely corresponding to one of the storage positions. A component coupled to the storage device shifts the received digital codes so that at the conclusion of a selected number of part transfer cycles, the digital code contained in a given one of the storage positions comprises a first digital code if a received part is located at the work unit corresponding to the given storage position, and otherwise comprises a second digital code. A component responsive to the contents of each of the storage positions of the digital storage device enables the work unit corresponding to the given storage position to perform its prespecified work task if a first digital code is contained in the given storage position at the conclusion of the selected number of part transfer cycles, and prevents such work unit from performing its prespecified work task if a second digital code is contained in the given storage position.

5 Claims, 10 Drawing Figures

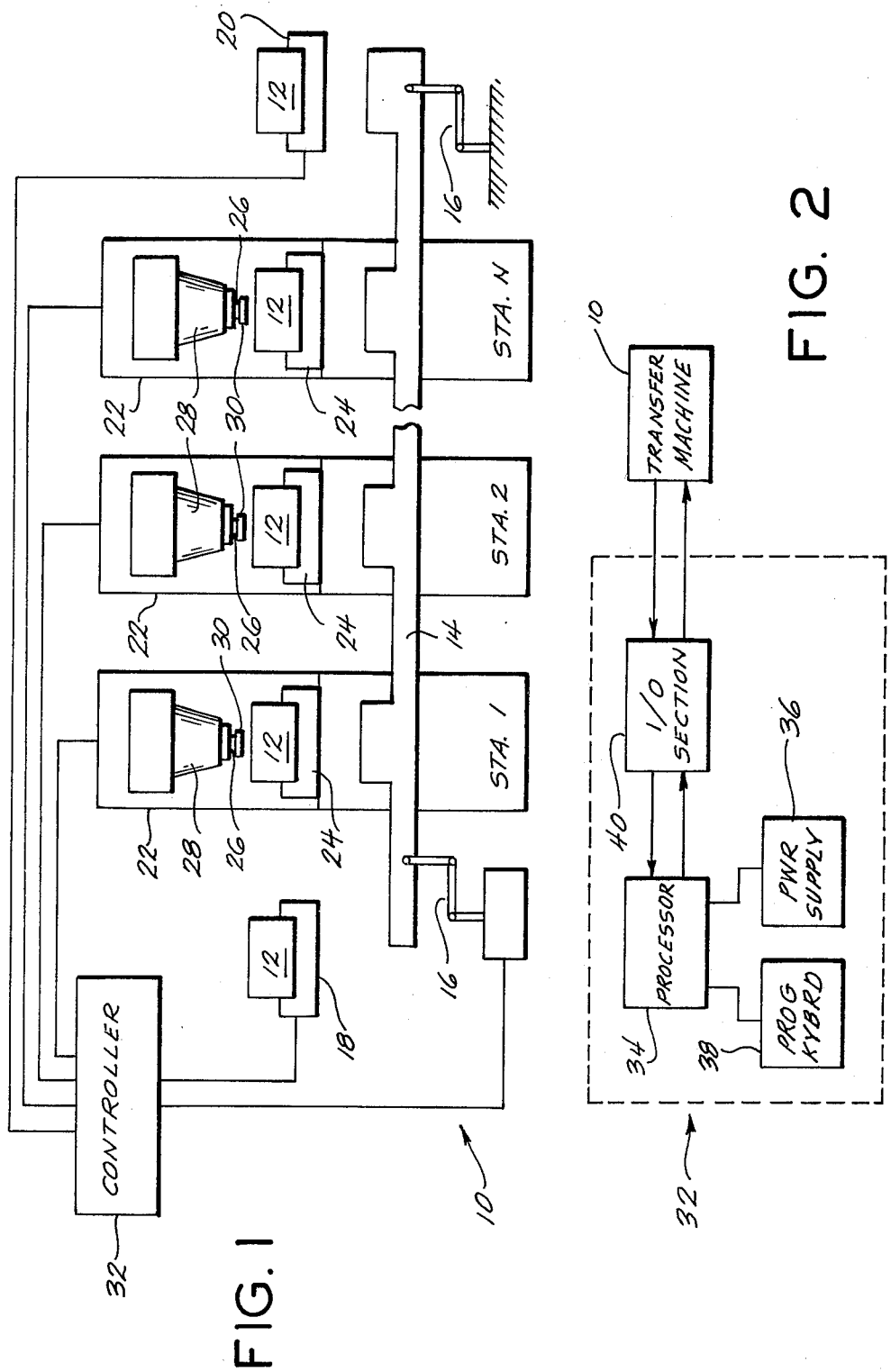

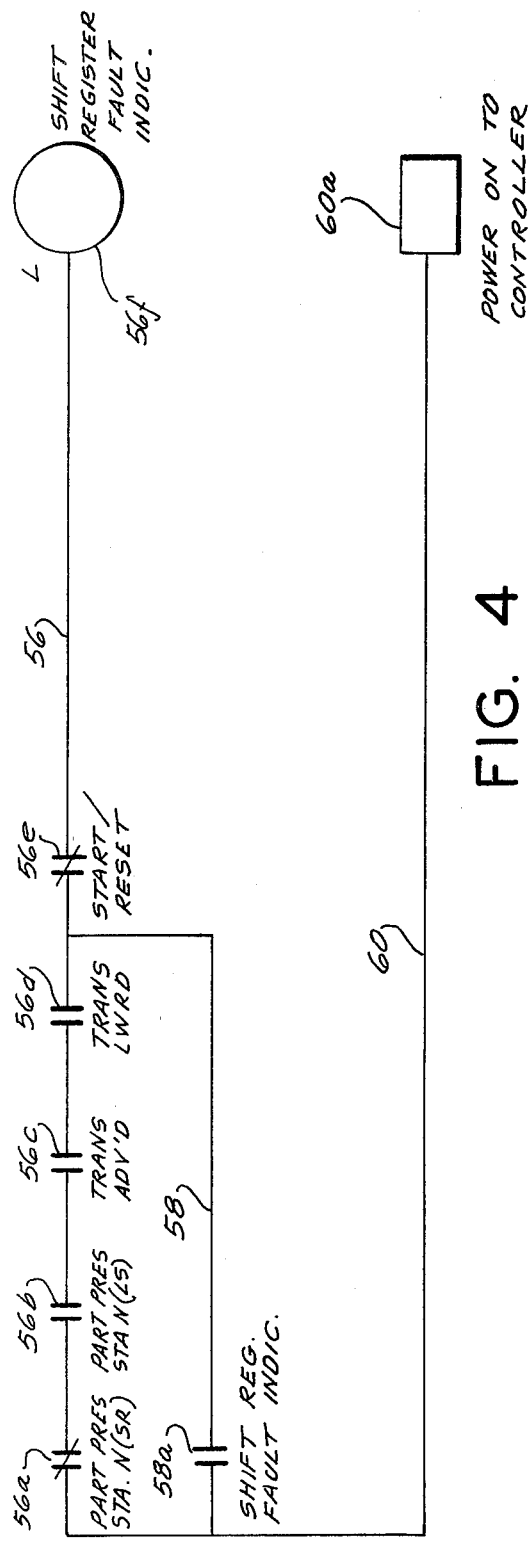
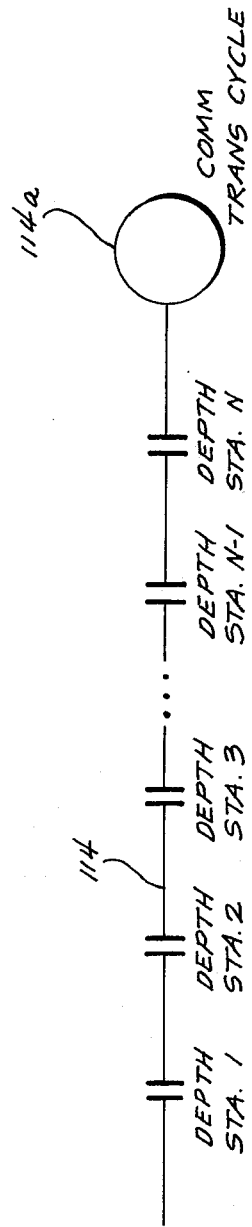
FIG. 4
FIG. 10

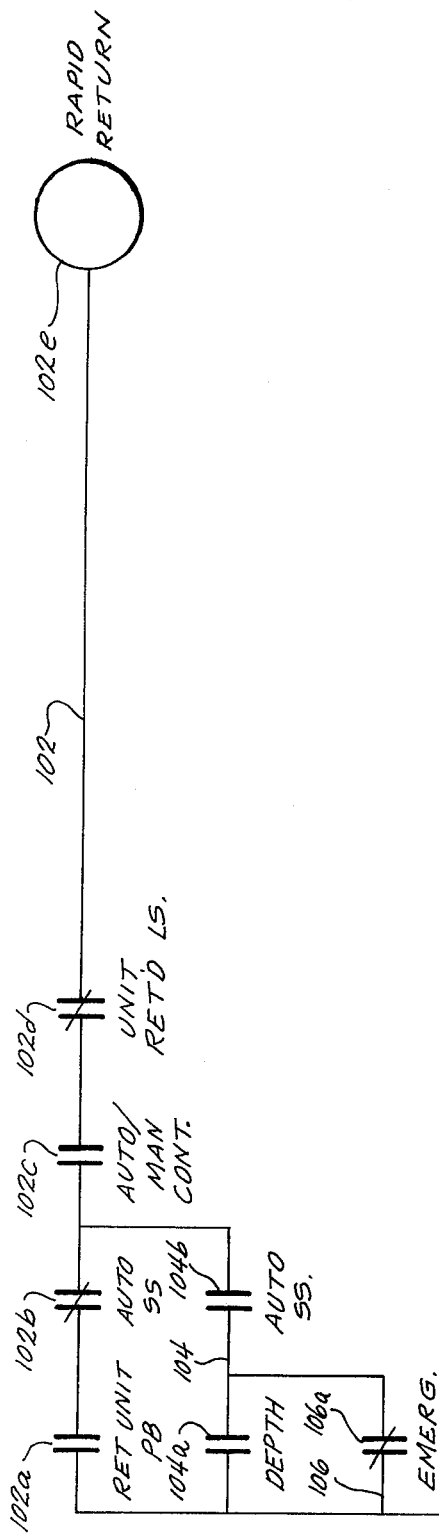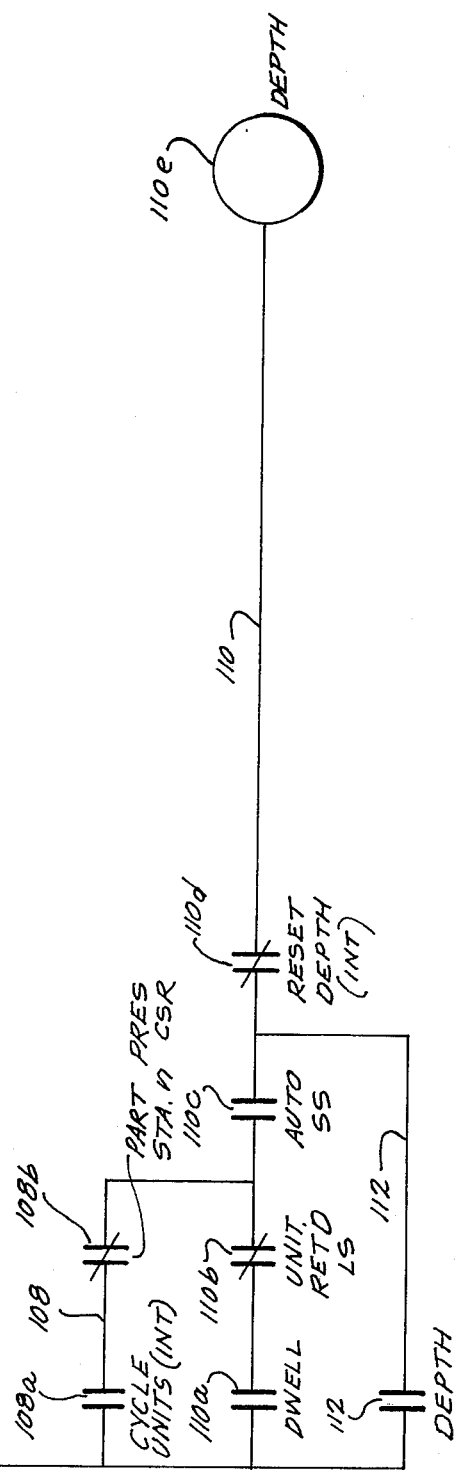
FIG. 9

TRANSFER MACHINE CONTROL

BACKGROUND OF THE INVENTION

The invention disclosed and claimed herein generally pertains to control techniques and apparatus for operating a transfer machine with improved efficiency. More particularly, the invention pertains to transfer machine control apparatus which is capable of activating respective work units of a transfer machine to perform their respective work tasks only when parts are present at their individual work stations. Even more particularly, the invention pertains to control apparatus of the above type wherein the movement of parts through a transfer machine is monitored by shifting digital data bits through a shift register in synchronous relationship with the movement of parts through the machine.

As is well known in various manufacturing activities, a transfer machine is a machine or machining system which is structured to receive a succession of work pieces or parts, and which performs a sequence of discrete work tasks upon each part. During each part transfer cycle in a succession of part transfer cycles, a transfer mechanism operates to move a part from a load station to the first work station in a work station sequence, to move a part from the final work station in the sequence to an unload station, and to advance each of the other parts in the machine by one work station in the work station sequence. After each transfer cycle, the transfer machine commences a work unit cycle during which a work unit at each of the work stations performs one of the discrete work tasks upon a part which has been advanced by the transfer mechanism.

Transfer machines of the above type have found wide application in the machining of metallic parts, particularly where large part volume is required. By locating a spindle-driven cutting tool at each work station, and by providing an electronic controller device to direct operation of the cutting tools and the transfer mechanism, a transfer machine can automatically perform a number of machining processes on each part in a continuous stream of parts, in a comparatively short period of time. However, the efficiency of transfer machine operation may be significantly reduced if, for some reason, there is a failure to load a part into the machine between part transfer cycles. When such failure occurs, automatic, continuous operation of the transfer machine ceases. The machine can then be operated only in a manual mode, or by operator intervention. Such operation, however, may create gaps in the stream of parts moving along the sequence of work stations. The creation of gaps, in turn, causes needless wear of the work units, since a unit will sometimes be cycled, or activated, when there is no part present at its particular work station.

In addition, if a work unit is cycled when a part is not present at its work station, the time required to machine a succession of parts will be unnecessarily increased. Generally, the work units require different amounts of time, or cycling times, to perform their respective work tasks, and it will be readily apparent that the period of time between two successive part transfer cycles can be no less than the longest of such cycling times. If the unit having the longest cycling time is operated when a part is absent from its work station, there will be a needless increase in the amount of time required before the next transfer cycle can take place.

Through his invention, the Applicant enables the operation of a transfer machine to be continued in spite of periodic failures to load parts into the machine. In addition, the invention enables a work unit to be cycled following a part transfer cycle only if a part is present at the unit, the time between part transfer cycles being limited to the longest cycling time of the units at which parts are actually present. The Applicant's invention may be practiced by a comparatively simple adaptation of a conventional transfer machine controller device. However, it is by no means intended to limit the scope of the invention thereto.

SUMMARY OF THE INVENTION

In the present invention, transfer machine apparatus is provided which includes a load station for receiving parts during at least some of the part reception periods in a succession of part reception periods, and which further includes a number of selectively located work units for performing prespecified work tasks upon received parts. A transfer means is provided for moving a given one of the received parts from the load station to each of the work units in a prespecified sequence, the given received part being moved from one of the work units to another one of the work units during a part transfer cycle in a succession of part transfer cycles. A digital code storage means receives a digital code during each of the part reception periods, the storage means receiving a first digital code if a part is received by the load station during the part reception period and the storage means receiving a second digital code if a part is not received by the load station during the part reception period. The storage means is provided with a number of discrete digital code storage positions, each of the work units uniquely corresponding to one of the storage positions. A shift means shifts the received digital code within the storage means in synchronous relationship with the movement of received parts so that at the conclusion of a selected number of part transfer cycles, the digital code contained in a given one of the storage positions comprises a first or second digital code, according to whether a received part is or is not present, respectively, at the work unit corresponding to the given storage position. A selective enabling means, responsive to the contents of each of the storage positions, enables the work unit corresponding to the given storage position to perform its prespecified work task at the conclusion of the selected number of part transfer cycles if a first digital code is contained in the given storage position, and otherwise prevents the work unit from performing its prespecified work task.

Preferably, the digital code storage means in the above apparatus comprises a shift register which is provided with a number of positions for storing discrete digital bits, each of the bit storage positions comprising one of the digital code storage positions. Each of the first digital codes comprises a digital bit of a first logic level, such as a logic 1 bit, and each of the second digital codes comprises a digital bit of a second logic level, such as a logic 0 bit. Preferably also, the shift means comprises means for shifting a given one of the digital bits from a first one of the bit storage positions during one of the part transfer cycles. The work unit which corresponds to the first storage position precedes the work unit which corresponds to the second storage position in the aforementioned work unit sequence.

In a preferred embodiment of the invention, each of the work units comprises a spindle-driven tool for performing a prespecified cutting operation on a metallic part. The transfer means for such embodiment comprises a transfer bar structure which is capable of operating during each of the part transfer cycles to move a received part from the load station to the first work unit in the work unit sequence, to move a received part from the final work unit in the sequence to an unload station, and to advance each of the other received parts by one work unit in the work unit sequence. Also in the preferred embodiment, the selective enabling means comprises means for either activating or deactivating a work unit after a part transfer cycle, according to whether a digital bit of a first or second logic level is contained in the bit storage position corresponding to the work station after the transfer cycle.

Alternatively, the present invention may be viewed as a method for controlling the operation of a transfer machine, such method comprising the steps of: entering a first digital bit into a shift register during a given part reception period, in a succession of part reception periods, if a part is received at a load station of the transfer machine during the given part reception period; entering a second digital bit into the shift register during the given part reception period if a part is not received at the load station during the given part reception period; moving one of the received parts to each of a number of work stations included in the transfer machine in a prespecified sequence; establishing a unique correspondence between each of the work stations and each of a number of bit storage positions which are included in the shift register; shifting the first and second digital bits within the shift register in synchronous relationship with the movement of received parts to respective work stations of the transfer machine; activating a given one of the work stations at a given time to perform a prespecified work task upon one of the received parts if a first digital bit is contained in the storage position which corresponds to the given work station at the given time; and preventing activation of the given work station at the given time if a second digital bit is contained in the bit storage position corresponding to the given work station at the given time.

OBJECTS OF THE INVENTION

An object of the present invention is to provide a transfer machine wherein a transfer operation or cycle will occur even if a part or workpiece is not present at the load station of the transfer machine.

Another object is to provide a transfer machine of the above type wherein a work unit of the transfer machine is activated to perform an assigned work task during a work unit cycle only if a part is located at the work unit during the work cycle.

Another object is to provide a transfer machine of the above type wherein the length of a work unit cycle is limited to the time which is required for all of the work units at which parts are present to complete their respective work tasks.

Another object is to provide an electronic controller device for controlling the operation of a transfer machine of the above type.

Another object is to provide electronic control apparatus for a transfer machine which activates or prevents activation of respective work units of the machine during a work cycle, in accordance with digital data which is stored in a shift register at the beginning of the work cycle.

These and other objects of the invention will become more readily apparent from the ensuing specification, when taken together with the drawings.

BRIEF DESCRIPTION OF THE DRAWINGS

FIG. 1 is an elevational view showing a generalized form of a transfer machine.

FIG. 2 is a block diagram showing a controller device for directing the operation of the transfer machine of FIG. 1.

FIGS. 3–10 show ladder diagrams which may be employed to structure the controller device of FIG. 2 for operation in accordance with the invention.

DETAILED DESCRIPTION OF THE PREFERRED EMBODIMENT

Figure 3:
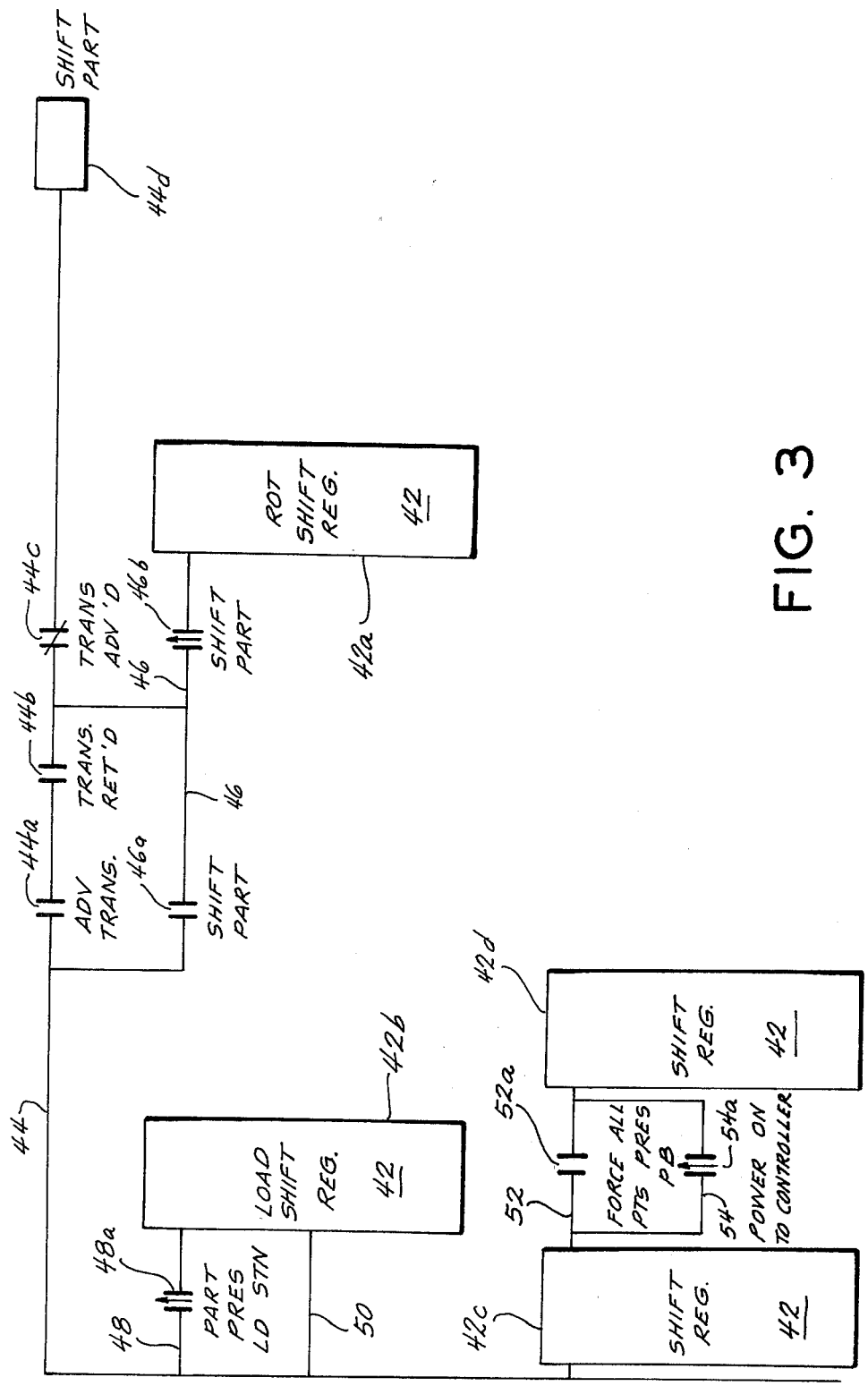

Referring to FIG. 1, there is shown a transfer machine 10 which is disposed to receive a stream of metallic parts 12 and to perform N work tasks on each received part, in a prespecified sequence. Transfer machine 10 is provided with a transfer bar or other part advance structure 14, and is further provided with a transfer bar driving mechanism 16, for manipulating the transfer bar through successive part transfer cycles. In addition, transfer machine 10 is provided with a load station 18, an unload station 20, and N work units 22. Each work unit 22 performs one of the above work tasks during a work unit cycle, and is located at one of the N work stations. The work units are respectively arranged at the work stations so that if a part 12 is moved consecutively from work station 1 to work station N, N work tasks will be performed thereupon, in the above prespecified sequence.

Each of the work units 22 usefully comprises a machine tool which is provided with a fixture 24, a spindle 26, and a spindlehead 28. A fixture 24 is provided to selectively retain a part 12, and a spindle 26 is provided to drive a cutting tool 30, such as a tool for performing milling, boring or other conventional metal cutting operations. The spindlehead 28 of a work unit 22 is movable in relation to a part 12 retained in the fixture of the work unit, to enable a tool 30 to be controllably fed into a retained part. It is to be understood that the specific forms of work units 22, as well as the other components of transfer machine 10, will be dependent upon the application which is to be made of the transfer machine. Consequently, FIG. 1 shows respective components of transfer machine 10 in very simplified or generalized forms.

Referring further to FIG. 1, there is shown a controller device 32, such as a programmable electronic controller, coupled to each of the components of transfer machine 10. Controller 32 is structured to operate respective components of transfer machine 10 in synchronous relationship with one another, so that the transfer machine will execute a succession of alternating part transfer and work unit cycles. In addition, controller 32 is structured, as hereinafter described to operate respective components of the transfer machine in accordance with the invention.

At the beginning of a part transfer cycle, controller 32 directs transfer bar driving mechanism 16 to raise transfer bar 14 upwardly. Bar 14 is thereby caused to engage every part 12 which is residing at a work unit 22 or at load station 18. Then, bar 14 is advanced, whereby a part at load station 18 is moved to the work unit at work station 1, a part at the work unit of station N is moved to unload station 20, and a part at the unit of work station m is moved to the unit at work station m+1, where m<N. Thereafter, bar 14 is lowered and then returned to its initial position, concluding the part transfer cycle.

After a part transfer cycle is concluded, controller 32 executes a work unit cycle. During a work cycle, every work unit 22 at which a part 12 is present is activated to feed its tool 30 into the part, at a controlled feedrate. The tool 30 of a work unit is fed to a depth which is predetermined in accordance with the work task which is to be performed by the unit. When all of the activated work units have reached their respective depths, the spindles and tools thereof are returned to their respective initial positions, whereupon controller 32 executes another part transfer cycle. Controller 32 is structured to limit the duration of a work cycle to the time which is required for the activated work units to complete their respective tasks.

After each part transfer cycle, load station 18 becomes disposed, during a part reception period, to receive a part for the next-following part transfer cycle. During a part reception period, controller 32 is responsive to both the reception and the non-reception of a part at load station 18. If a part is present at unload station 20 after a transfer cycle, it is removed therefrom.

Referring to FIG. 2, there is shown a programmable controller device 32 of a type which is presently used to control transfer machines or other work systems, and which may be adapted to operate transfer machine 10 in accordance with the present invention. Such controller 32 includes a processor 34, which is coupled to a power supply 36, a programming keyboard 38, and an I/O (input/output) section 40. Keyboard 38 is employed to enter a set of instructions into processor 34, whereby controller 32 becomes structured to perform specified sequences of logic operations as transfer machine 10 receives and processes a succession of parts 12. Results of respective logic operations cause control signals to be coupled to transfer machine 10, through I/O section 40, and also provide conditions for further logic operations. Other conditions for the logic operations are established by signals which are coupled into processor 34 from the transfer machine through I/O section 40. Such input signals indicate the state or condition of respective components of the transfer machine at various times during successive transfer and work cycles.

Usefully, controller 32 comprises a controller device, such as a Modicon 584, which receives instructions in the form of a series of ladder diagrams. As is well known in the art, a ladder diagram is a graphic representation of some of the logic operations which are performed by a controller, in order to generate control signals which will cause a transfer machine 10 to operate in a specified manner. A ladder diagram is comprised of a number of horizontal lines, known as rungs, each rung including one or more logic elements or relay contacts. Each contact represents a condition of a transfer machine component, a contact being shown in a ladder diagram as being open or closed to indicate the normal state of the condition during transfer machine operation. In addition to relay contacts, a rung of a ladder diagram may include a function box, such as a timer or a register.

In a ladder diagram, power can flow along a rung only from left to right. A coil, located at the right end of a rung, is therefore activated when all of the contacts of the rung are simultaneously in a closed state. Alternatively, a coil may become activated if vertical paths are provided between the rung of the coil and adjacent rungs, to establish a power flow path which includes segments of different rungs. Power may flow either upwardly or downwardly through such vertical paths.

It will be apparent that various conditions which are represented by the relay contacts of the ladder diagrams will be continually changing as transfer machine 10 is operated through successive part transfer and work unit cycles. Controller 32 therefore repetitively scans the contacts of each of the ladder diagrams, at intervals which are very brief. If one or more of the conditions which specify the activation or deactivation of a coil changes, the state of the coil will be appropriately changed, during the very next scan. Consequently, when a set of conditions occurs in the transfer machine which specifies a particular control signal, the control signal will be immediately generated by the controller and coupled to the transfer machine.

A normal convention in a ladder diagram is to represent an open contact by means of two vertical, spaced-apart parallel lines, and to represent a closed contact by means of vertical spaced-apart lines which are joined by a diagonal line. A contact which is closed for only one scan, following the activation of a coil with which the contact is associated, may be represented by placing an upwardly pointing arrow between two spaced-apart vertical lines. As a further convention, if the activation of a coil causes a control signal to be coupled out of controller 32, the coil may be represented by a circle placed at the right end of a rung. On the other hand, if activation of a coil only provides a condition for further logic operations within the controller, the coil is represented by a rectangle.

In order to operate respective components of transfer machine 10, as the transfer machine executes successive part transfer and work unit cycles, a number of well-known or conventional instructions, in ladder diagram format, are entered into controller 32 through keyboard 38. One of such conventional ladder diagrams is an interlock circuit, which generates signals which are simultaneously coupled to each work unit 22 to insure uniform operation thereof. Such interlock circuit, as well as a number of other conventional ladder diagrams entered into controller 32, are not modified by the present invention from their respective standard forms, and are therefore not described in detail herein. However, several other ladder diagrams entered into controller 32 are not conventional, as far as is known, and are therefore described herein in conjunction with FIGS. 3–5. A number of other ladder diagrams, while basically conventional in the art, have required modification in light of the invention, and are therefore described in conjunction with FIGS. 6–10.

Referring to FIG. 3, there is shown a ladder diagram wherein a shift register 42 is coupled to rungs 44, 46, 48, 50, 52 and 54. Reference numerals 42a–d of FIG. 3 are employed to indicate how respective rungs interact with register 42, to shift data therein, and to load data thereinto. Shift register 42 usefully comprises one of the aforementioned function boxes of controller 32, and is provided with N consecutive positions for storing digital data bits. If a particular digital data bit is loaded into shift register 42 during a particular part reception period, and if data in shift register 42 is shifted or rotated once in response to each part transfer period, the particular data bit will be in the nth bit storage position after n transfer cycles, following the particular part reception period. Also, if a part 12 is received at load station 18 during the particular part reception period, such part will be present at the nth work station after n transfer cycles.

From the above relationships, it will be seen that if a logic 1 data bit is loaded into shift register 42 when a part 12 is received by transfer machine 10 during a part reception period, if a logic 0 is loaded into the register when a part 12 is not received during a part reception period, and if the register is shifted once in response to each transfer cycle, the data contained in shift register 42 will indicate, at any given time, the presence of absence of a part 12 at each of the work units 22 of transfer machine 10. By judicious selection of the contacts included in rungs 44, 46 and 48, shift register 42 may be operated in accordance with the above requirements.

Referring further to FIG. 3, there is shown the load terminal of shift register 42 coupled to the right end of rung 48, rung 48 being provided with a contact 48a. Contact 48a is closed by a signal received from load station 18 which indicates that a part is present thereat, whereupon a logic 1 is coupled to the load terminal of register 42. If a part is not present at the load station, contact 48a remains open, and a logic 0 is coupled to the load terminal of register 42. Operation of contact 48a is synchronized in time with the reception or non-reception of parts at load station 18 during successive part reception periods, and with the periodic shifting of register 42.

To shift or rotate data in shift register 42 in response to each part transfer cycle, the shift or clock terminal of the register is coupled to rung 46, which is interconnected with rung 44 through vertical paths. Rung 44 includes an "advance transfer" contact 44a, which is closed when transfer bar 14 is advancing during a transfer cycle, and further includes a "transfer returned" contact 44b, which is closed when transfer bar 14 is returned prior to the beginning of a transfer cycle. Therefore, coil 44d is activated when a transfer cycle has been initiated and each part 12 in transfer machine 10 is being shifted by one work station. Coil 44d is used for the contacts 46a and 46b in rung 46, so that register 42 will be shifted by the very next scan following transfer cycle initiation.

Referring once more to FIG. 3, there is shown shift register 42 coupled to rungs 52 and 54. Rung 52 is provided with a "force all parts present" push button contact 52a, and rung 54 is provided with "power onto controller" contact 54a. By providing rung 52, a part may be removed from a work station of transfer machine 10, for some reason, and then be replaced in the work station, a number of transfer cycles later, when a part is not present at the work station. When an "all parts present" push button is depressed, contact 52a will be closed, causing logic 1 data bits to be entered into all N bit storage positions of register 42. The movement of the replaced part to subsequent work stations, to complete the processing thereof by transfer machine 10, will thereby be accompanied by a logic 1 data bit in the shift register. Rung 52 may also be employed to enter a part directly into one of the work stations of transfer machine 10, without first placing the part in load station 18.

Referring to FIG. 4, there is shown a ladder diagram which is employed to provide notice if an error occurs in the operation of shift register 42. The ladder diagram of FIG. 4 comprises rungs 56, 58 and 60, interconnected as shown, rung 56 including contacts 56a–e and rung 58 including a contact 58a. Contact 56a is generally closed during the operation of transfer machine 10, but is opened at the conclusion of a part transfer cycle if a logic 1 is present in the Nth bit storage position of shift register 42. Contact 56b is normally open during transfer machine operation. However, if a limit switch located at work station N senses that a part is present at work station N at the conclusion of a transfer cycle, a signal is coupled to controller 32, through I/O section 40, to close contact 56b. Contacts 56c and 56d become closed when transfer bar 14 is respectively advanced and lowered, whereby the closing of contacts 56c and 56d indicate the occurrence of a transfer cycle. Contact 56e, a "start/reset" control, is normally in a closed condition.

From the above logic conditions specified by rung 56, it will be apparent that coil 56f, coupled to the right end of rung 56, becomes activated only when a part 12 is present at work station N at the same time that a logic 0 data bit is contained in the Nth storage position of shift register 42. The occurrence of such conditions together indicates a fault in the operation of register 42, in monitoring the flow of parts through transfer machine 10. Consequently, the activation of coil 56f causes a signal to be coupled to transfer machine 10, to activate a shift register fault indicator light. Notice is thereby provided to a transfer machine operator that a part at work station N may not have been properly machined. If movement of the part through the transfer machine was accompanied by a logic 0 moving through shift register 42, various work units would not have been activated to perform their respective work tasks when such part was at their work stations.

The activation of coil 56f is also employed as contact 58a in rung 58, which shunts contacts 56a–d of rung 56. The activation of coil 56f is thereby maintained until "start/reset" control 56e is operated, regardless of whether any of the contacts 56a–d become opened. Rung 60 of the ladder diagram of FIG. 4, which does not contain any contacts, shows the flow of power to controller 32.

Figure 5:
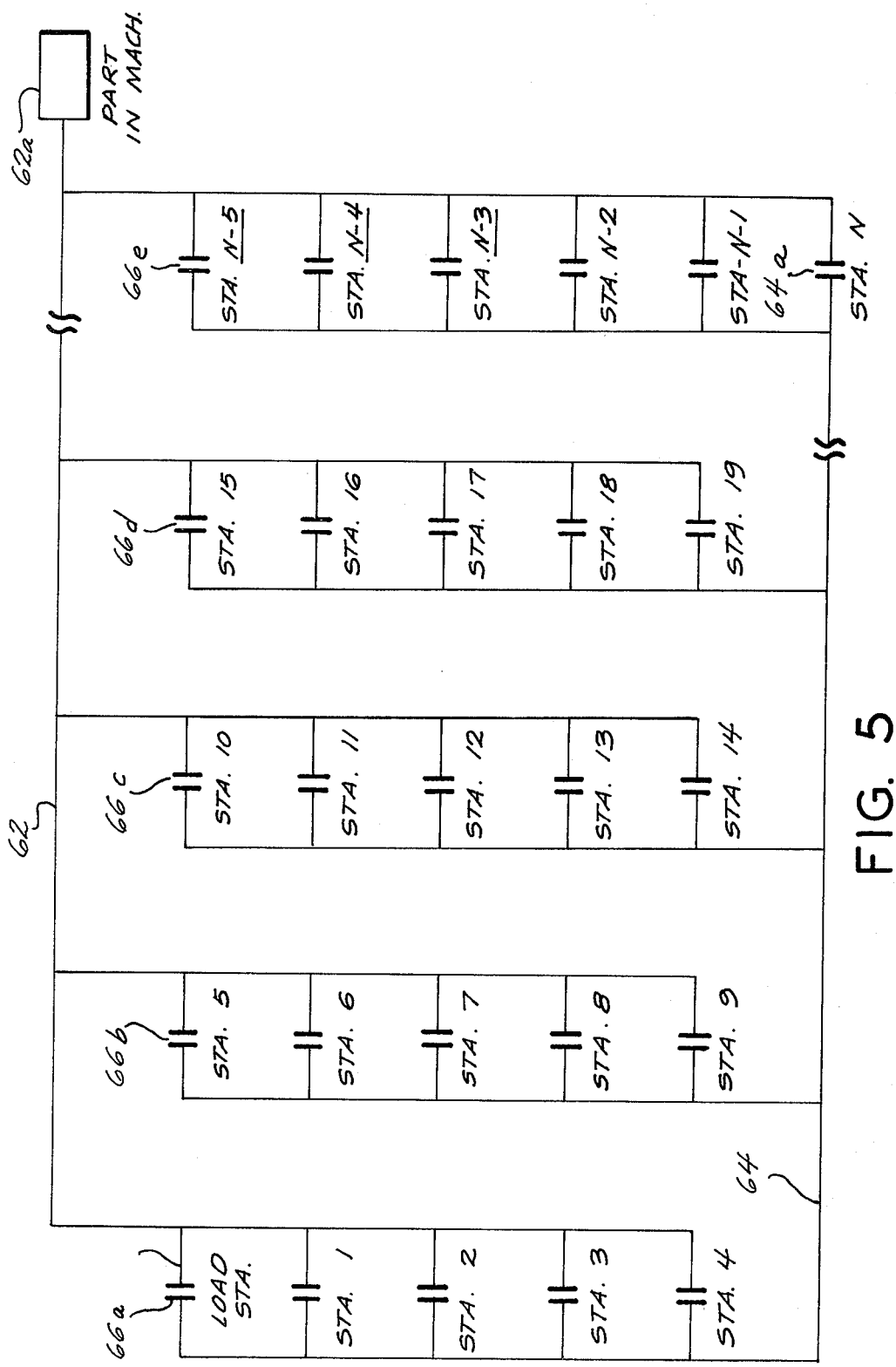

Referring to FIG. 5, there is shown a ladder diagram which is provided with an upper rung 62 coupled to a coil 62a, a lower rung 64, and a number of intermediate rungs, each of the intermediate rungs including a number of contacts. Each of the contacts of the intermediate rungs, as well as contact 64a of lower rung 64, is connected by vertical paths between upper rung 62 and lower rung 64 so that if at least one of the contacts becomes closed, a power flow path will be established to activate coil 62a. Contact 66a is closed when a signal is coupled to control 32 to indicate that a part is present at load station 18, and the contact of the nth work station is closed by the presence of a logic 1 in the nth bit storage position of register 42. The activation of coil 62 therefore represents the presence of at least one part 12 in transfer machine 10.

Figure 6:
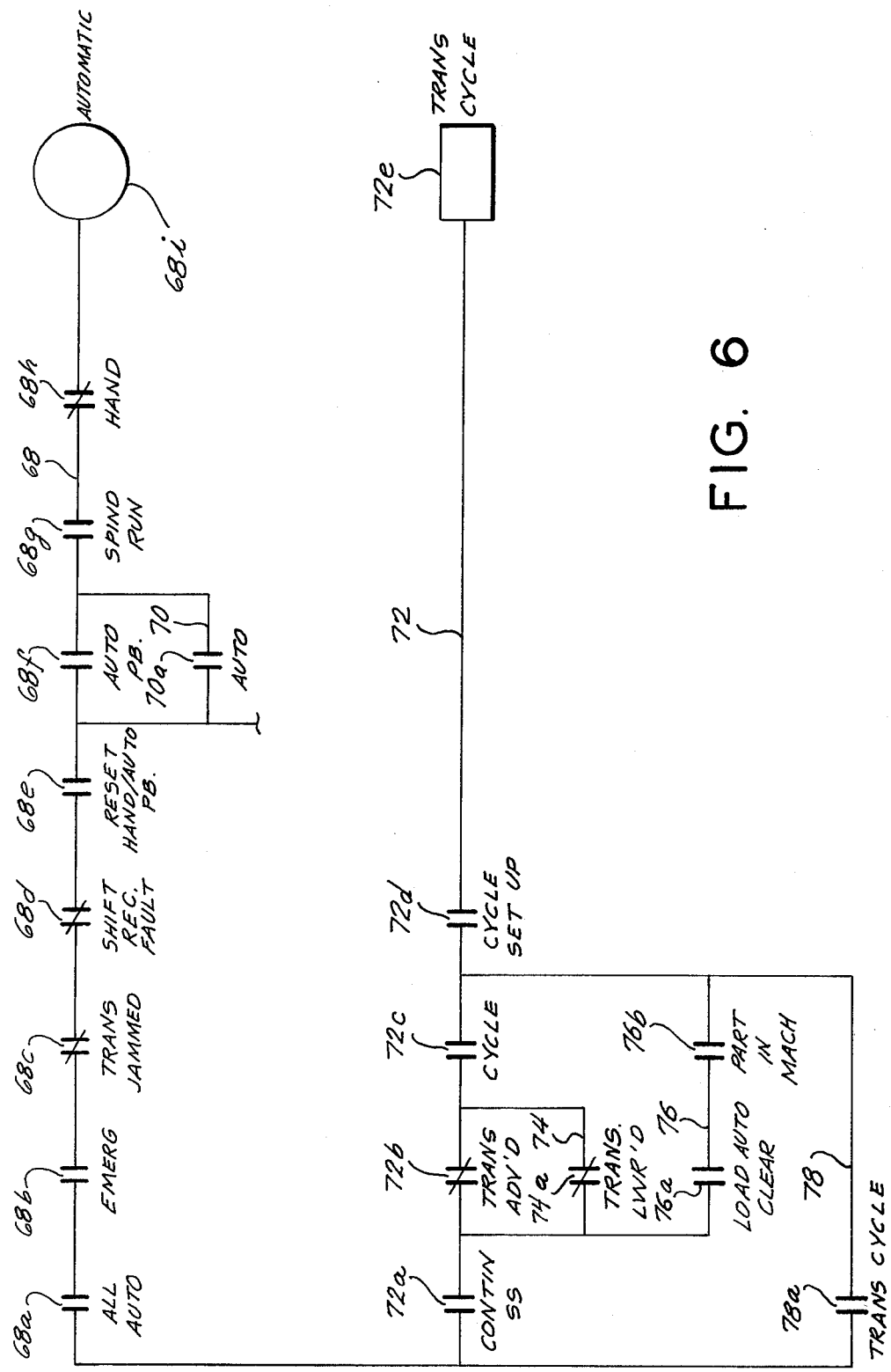

Referring to FIG. 6, there are shown rungs 68 and 70, which are interconnected to activate a coil 68i when all of the components of transfer machine 10 are operating in an automatic mode, and in the absence of a fault or error in the operation of shift register 42. Contact 68a of rung 68 is closed when all of the components of transfer machine 10 are operating in an automatic mode, and a contact 68b is closed in the absence of an emergency condition in the transfer machine. Contact 68c remains closed unless transfer bar 14 malfunctions, and contact 68d remains closed in the absence of a shift register fault. Contact 68e is a reset push button contact, and contact 68f is operated by a push button for selecting an automatic mode of transfer machine operation. After such mode has been selected, coil 68i is activated, whereupon a signal is coupled to an automatic mode indicator light. The activation of coil 68i is also employed as contact 70a of rung 70, which shuts push button contact 68f after operation of the machine commences. Contact 68g is closed to indicate that the spindles of respective work units 22 are on, and contact 68h is closed when the transfer machine is not being operated in a manual mode.

Referring further to FIG. 6, there are shown rungs 72–78, the activation of coil 72e of rung 72 being specified by contacts 72a, 72d, 76a and 76b, the activation of coil 72 indicating the commencement of a part transfer cycle. Contact 72a is closed when a selector switch is operated to place transfer machine 10 in a mode of continuous operation, and contact 72d is closed when the transfer machine is prepared, or set up, for a transfer cycle. Contact 76a is closed to indicate that structure at load station 18, which is employed to deposit a part in the load station in preparation for a part transfer cycle, has been withdrawn and will not interfere with movement of transfer bar 14. Contact 76b is closed by the activation of coil 62a of FIG. 5, to indicate that at least one part 12 is present at either load station 18 or at one of the work stations of transfer machine 10. By providing contact 76b, a part transfer cycle will occur if even a single part is available to the machine for processing. However, if there are no parts available at all, the machine will not perform a part transfer cycle.

When coil 72e is activated, contacts 72c and 78a become closed, whereby a shunt is placed across rung 76. As a part transfer cycle proceeds, contact 72b is opened when transfer bar 14 has been advanced, and contact 74a is opened when the transfer bar has been lowered, whereby the part transfer cycle is concluded.

Figure 7:
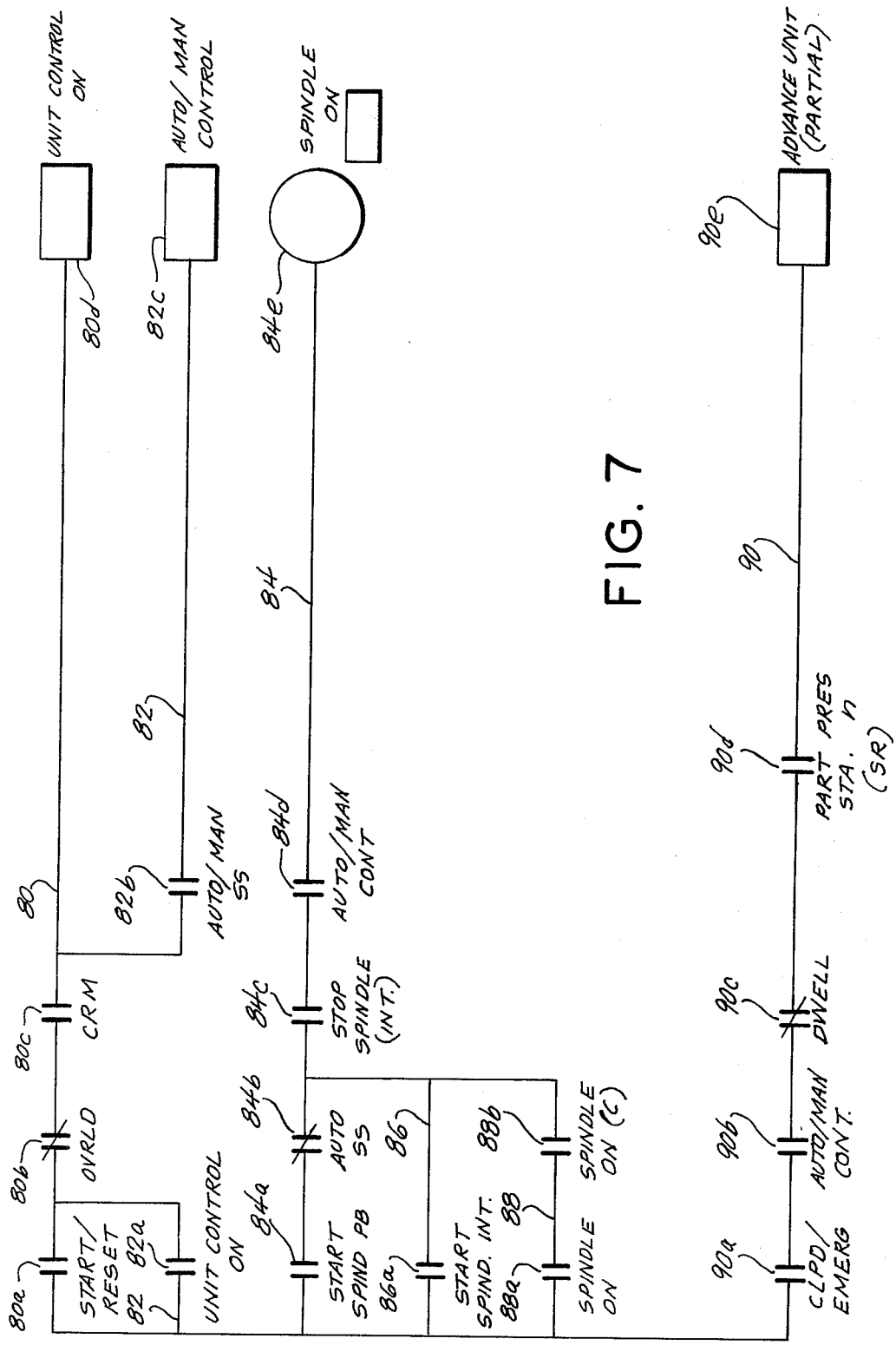
Figure 8:
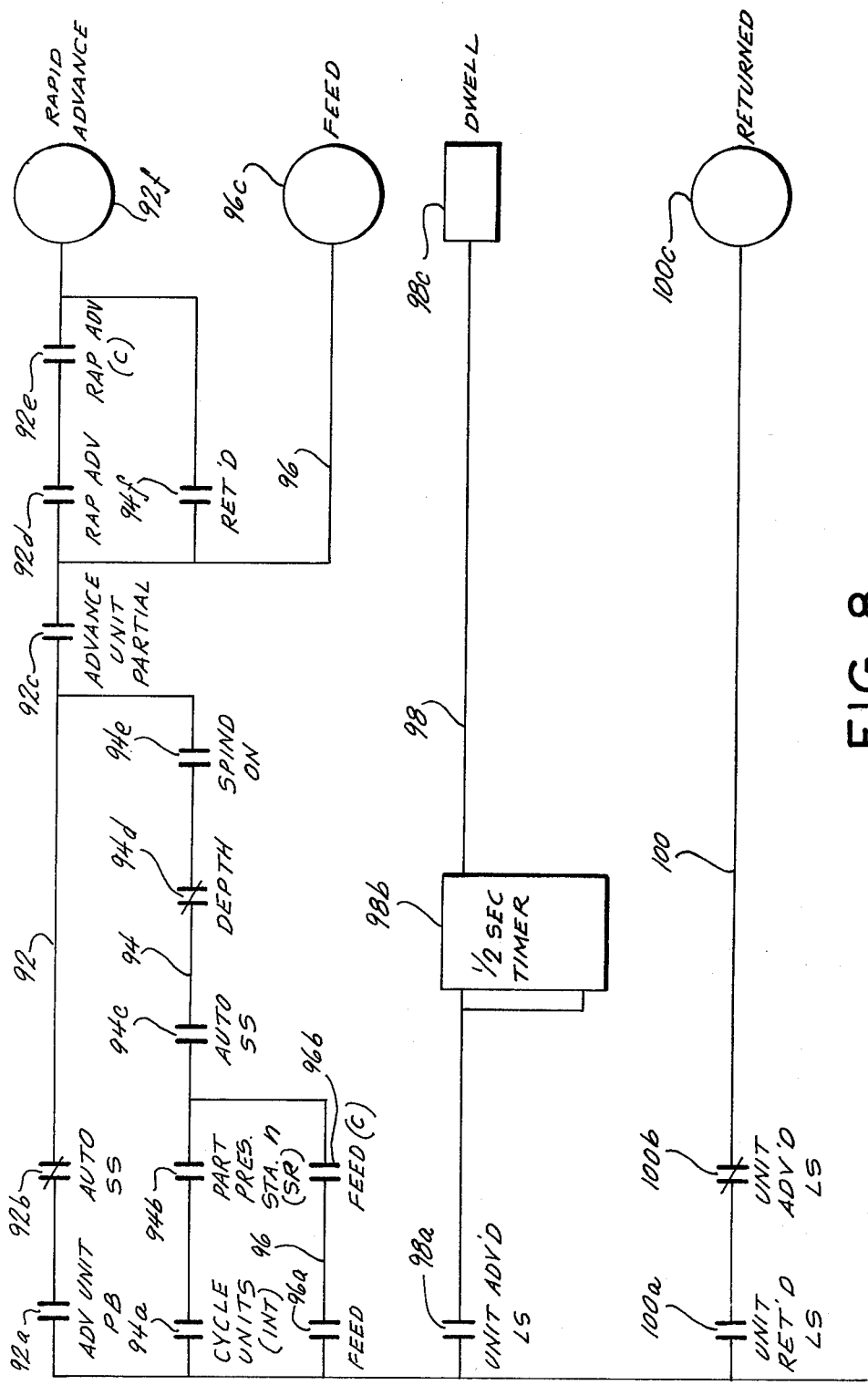

FIGS. 7-9 are ladder diagrams which are entered into controller 32 to direct the operation of the nth work unit 22, located at the nth work station, during successive work unit cycles. Referring to the ladder diagram of FIG. 7, there are shown rungs 80 and 82, interconnected to define the conditions of activation of coil 80d, whereby the control of the nth work unit is placed in an "on" state. To activate coil 80d, contact 80a must be closed by operating a start/reset control, and contact 80b must remain in a closed condition, indicating the absence of a unit overload condition. In addition, contact 80c must be closed by the operation of a master control relay, which is conventionally included in controller 32. When coil 80d is activated, contact 82a of rung 82 is closed, shunting start/reset contact 80a. If contact 82b is closed after the unit control comes on, by the operation of an automatic/manual selector switch, automatic/manual control coil 82c becomes activated.

Referring further to the ladder diagram of FIG. 7, there are shown rungs 84, 86 and 88 interconnected to specify the conditions for activating coil 84e, that is, to activate the spindle 26 of the nth work unit. Contact 84a of rung 84 is closed by means of a "start spindle" push button, and contact 84b is closed by not selecting an automatic mode of operation, by means of a selector switch. Contact 84c is closed by a signal from the aforementioned interlock circuit, and contact 84d is closed by the activation of coil 82c.

Contacts 84a and 84b are shunted by rungs 86 and 88, contact 86a of rung 86 being closed by a "start spindle" signal which is coupled thereto from the interlock circuit. Contact 88a is closed by a "spindle on" signal received from a spindle starting device, which is conventionally included in each spindle 26, and contact 88b is closed when coil 84e becomes activated. It will be seen that a power flow path is established through rung 88 only when (1) either the interlock circuit of controller 32 indicates that the spindle should be on, or else the spindle is not in an automatic mode and a manual push button is operated, and (2) coil 84e is activated, indicating that the spindle actually is on.

Referring to rung 90 of FIG. 7, there are shown the condition for activating a coil 90e, which indicates the partial advance of the tool 30 of the nth work unit toward a part 12, which is clamped in the fixture 24 of the nth unit. In order to commence advancement, contact 90a must be closed, indicating that the fixture is in a clamped condition, and there must be an absence of an emergency condition. In addition, coil 82c must be activated, to close contact 90b, and dwell contact 90c must be in a closed condition by the non-activation of coil 98c which is hereinafter referred to. Finally, in accordance with the invention, a logic 1 data bit must be contained in the nth storage position of shift register 42, to close contact 90d. If a logic 0 is contained in the nth bit storage position, indicating the absence of a part at the nth work station, contact 90d will remain open during the upcoming work unit cycle, coil 90e will not be activated, and the tool 30 of the nth work unit will not be advanced.

Referring to FIG. 8, there is shown a ladder diagram wherein rungs 92, 94 and 96 are interconnected to control the rapid advance of the tool 30 of the nth work unit, and also to control the feeding of the tool into a part which is clamped in the fixture of the unit. The tool is rapidly advanced when it is moved through the air gap which lies between the initial position of the tool and the clamped part. In order to rapidly advance and then feed the tool, either contacts 94a-94e must be closed, or else contacts 92a and 92b must be closed. Contact 92a is closed by operating an "advance unit" push button, and contact 92b is closed by means of an automatic selector switch contact. Also, contact 92c must be closed by the activation of coil 90e. If the above conditions are met, and if tool 30 of the nth work unit is initially in a returned position, a power flow path is established to rapid advance coil 92f.

When coil 92f is activated, contact 92e is closed. If contact 92d is also closed, by a signal received from a rapid advance starting device, contact 94f will be shunted. The activation of coil 92f will therefore be maintained as the tool 30 of the nth work unit is moved from its returned position.

To further maintain the activation of coil 92f, as well as of coil 96c, contacts 94a-e of rung 94 are provided to shunt contacts 92a-b. Contact 94a is closed by a signal from the controller interlock circuit which indicates that all of the units should be in a work cycle, and contact 94b is closed if a logic 1 data bit is present in the nth bit storage position of shift register 42. If a logic 0 is present in the nth bit position, indicating the absence of a part at the nth work unit, advancement and feeding of the tool 30 of the nth work unit cannot be maintained.

Referring further to rung 94, there is shown contact 94c representing the automatic selector switch. Contact 94d is provided to prevent further advancement or feeding when the tool of the nth unit has reached its specified depth, and contact 94e is provided to prevent feeding of the tool into a part unless the spindle 26 of the nth work unit is on.

Referring to rung 96, there is shown contact 96a, which is closed by a feed signal from a feed start device, and there is shown contact 96b which is closed by the activation of coil 96c.

Referring to rung 98 of FIG. 8, there is shown a contact 98a which is closed when the nth work unit has been fully advanced. Controller 32 receives notice of such condition from a signal which is coupled to the controller from a limit switch at the nth unit, the limit switch being tripped by full advancement of the unit. Rung 98 is further provided with a timer function box 98b, which is structured to time a one-half second period. Consequently, one-half second after the nth work unit has been fully advanced, dwell coil 98c of rung 98 becomes activated.

Referring to rung 100 of the ladder diagram of FIG. 8, there is shown a contact 100a which is closed when the nth work unit is returned to its initial position, at the conclusion of a work unit cycle. Since contact 100b is closed by such time, coil 100c is activated, to indicate that the work unit has been returned. Contact 100a is closed by a signal which is provided by a second limit switch at the nth work unit, the second limit switch being situated to generate a signal when the work unit returns to its initial position.

Referring to the ladder diagram of FIG. 9, there are shown rungs 102 and 104 which establish conditions for activating a coil 102e, whereby the tool of the nth work unit is returned to its initial position, at the conclusion of a work unit cycle. Return of the tool may be initiated by means of a "return unit" push button, to close contact 102a. However, if the tool of the nth work unit has reached its specified depth, return of the tool is initiated automatically, by means of contact 104a of rung 104.

Referring to rung 110 of the ladder diagram of FIG. 9, there is shown depth coil 110e being activated by the activation of dwell coil 98c and by the released state of the aforementioned unit returned limit switch. However, if a part is not present at the nth work unit during a work unit cycle, the unit will not be activated, preventing the closure of contact 110a. Consequently, contacts 110a and 110b of rung 110 are shunted by rung 108. Contact 108a is closed by a signal from the controller interlock circuit to cycle the work units, and contact 108b is closed by a logic 0 in the nth bit storage position of shift register 42. By providing rung 108 as shown in FIG. 9, a power flow path will be established to coil 110e even when the nth work unit 22 is not cycled during a work cycle, because of the absence of a part at the unit.

When coil 110e is activated, contact 112a is closed, establishing a power flow path through rung 112.

Referring to FIG. 10, there is shown a ladder diagram having a number of contacts connected in series, each contact being closed when the depth coil 110e of one of the work units 22 becomes activated. The activation of coil 114a indicates that a work unit cycle has been completed, and that a part transfer cycle may be commenced. Contacts of rung 114 which correspond to work units at which parts are absent will remain closed during a work cycle, due to the provision of rung 108 in the ladder diagram of FIG. 9, as aforementioned. Each of the other contacts of rung 114 is closed when one of the work units which is in operation during a work unit cycle completes its work task. Consequently, the duration of any given work unit cycle is not longer than the longest cycling time of the work units which are actually in operation during the work cycle.

From the foregoing description, it is seen that transfer machine 10 is operated in accordance with the invention by repetitively performing a number of logic operations, the results of a particular logic operation being determined by states of various components of the transfer machine and by the contents of a shift register. It will be readily apparent that instead of performing the logic operations by means of a controller which is structured by entering specified ladder diagrmas thereinto, the logic operations could be performed by a judicious interconnection of discrete standard electronic components, such as AND gates and OR gates. The shift register could also comprise a standard, hard-wired, component. The interconnection of such components would be readily apparent to one of skill in the art in light of the above ladder diagrams, which specify the various logic operations which must be performed.

It is anticipated that in a further modification of the invention, a suitably programmed digital computer could be employed to perform the required logic operations.

Obviously, many other modifications and variations of the present invention are possible in light of the above teachings, and it is therefore understood that within the scope of the disclosed inventive concept, the invention may be practiced otherwise than as specifically described.

What is claimed is:

1. In a transfer machine which is disposed to load parts during a succession of part reception periods, wherein the transfer machine operates in alternating work unit and part transfer cycles to selectively machine loaded parts, and wherein different work units of the transfer machine require different operating times to complete their respective work tasks, apparatus responsive to loading of and failure to load parts for adjusting the length of a work unit cycle to the longest operating time of the work units at which parts are actually present during the work unit cycle, said apparatus comprising:

a shift register providing positions for storing discrete digital data bits, each of said bit storage positions uniquely corresponding to one of said work units and being arranged in a storage position sequence so that the bit storage position at a particular location in said storage position sequence corresponds to the work unit which is at the particular location in the work unit sequence of said transfer machine;

means for entering a digital bit of a first logic level into said shift register when a part is loaded into said transfer machine during one of said part reception periods, and for entering a digital bit of a second logic level into said shift register when a part is not loaded into said transfer machine during one of said part reception periods;

means for advancing each of the digital bits contained in said shift register by one bit storage position in said storage position sequence in response to a part transfer cycle, a transfer mechanism of said transfer machine advancing each of said loaded parts by one work unit in said work unit sequence during a part transfer cycle;

means responsive to the contents of said shift register after a given one of said part transfer cycles for activating given work units to perform their specified work tasks if a digital bit of a first logic level is contained in the bit storage positions corresponding to said given work units, and for preventing activation of said given work units of a digital bit of a second logic level is contained in the bit storage positions corresponding to said given work units;

means responsive to operation of said activated work units for generating a signal at the completion of all of the work tasks of said activated work units; and means responsive to said signal and to the contents of said shift register for commencing another one of said part transfer cycles upon the simultaneous occurrence of a first condition and a second condition, said first condition occurring when said signal is generated and said second condition occurring when each of the work units which is not activated after said given part transfer cycle corresponds to a bit storage position of said shift register which contains a digital bit of said second logic level.

2. The apparatus of claim 1 wherein said transfer machine wherein each of said work units includes a spindle driven cutting tool which is feedable into a metallic part, and wherein:

said apparatus includes means responsive to the operation of each of said activated work units for commencing another of said part transfer cycles upon the cutting tools of all of said activated work units being fed to depths which are respectively associated with the completion of the work tasks of said activated work units.

3. The apparatus of claim 2 wherein: said apparatus includes means for generating a signal after one of said part transfer cycles which indicates that a digital bit of said second logic level is contained in the final bit storage position of said storage position sequence, and one of said loaded parts is present at the final work unit in said prespecified work unit sequence.

4. The apparatus of claim 2 wherein said transfer machine includes a load station which is disposed to receive a part during each of said part reception periods, and wherein:

said apparatus includes a logic means responsive to the reception and non-reception of a part of said load station during said part reception periods, and also to the contents of said shift register, for preventing said transfer mechanism from performing a part transfer cycle when a part has not been received at said load station during a part reception period and all of the digital bits contained in said shift register are of said second logic level.

5. The apparatus of claim 4 wherein:

said apparatus includes means coupled to said shift register for enabling an operator of said transfer machine to selectively enter digital bits of said first logic level into all of said storage positions of said shift register.

* * * * *